(12) United States Patent (10) Patent No.: US 8,379,304 B2
Nishizaka et al. (45) Date of Patent: Feb. 19, 2013

(54) DARK FIELD MICROSCOPE AND ITS ADJUSTING METHOD

(75) Inventors: Takayuki Nishizaka, Tokyo (JP); Ryohei Yasuda, Chapel Hill, NC (US)

(73) Assignee: Japan Science and Technology Agency, Saitama (JP)

( * ) Notice: Subject to any disclaimer, the term of this patent is extended or adjusted under 35 U.S.C. 154(b) by 451 days.

(21) Appl. No.: 12/301,858

(22) PCT Filed: May 23, 2007

(86) PCT No.: PCT/JP2007/060554
§ 371 (c)(1),
(2), (4) Date: Nov. 21, 2008

(87) PCT Pub. No.: WO2007/136100
PCT Pub. Date: Nov. 29, 2007

(65) Prior Publication Data
US 2010/0202044 A1    Aug. 12, 2010

(30) Foreign Application Priority Data

May 24, 2006   (JP) .................................. 2006-144050

(51) Int. Cl.
*G02B 21/10* (2006.01)
(52) U.S. Cl. ........................................................ 359/385
(58) Field of Classification Search ........................ None
See application file for complete search history.

(56) References Cited

U.S. PATENT DOCUMENTS

| 5,208,648 A * | 5/1993 | Batchelder et al. ......... 356/237.1 |
| 6,243,197 B1 * | 6/2001 | Schalz ............................ 359/388 |
| 2005/0168808 A1 * | 8/2005 | Ishiwata ........................ 359/368 |

FOREIGN PATENT DOCUMENTS

| JP | 7-5397 A | 1/1995 |
| JP | 2002-221666 A | 8/2002 |

OTHER PUBLICATIONS

Machine translation of JP 07-005397 A.*

* cited by examiner

*Primary Examiner* — Derek S Chapel
(74) *Attorney, Agent, or Firm* — Sampson & Associates, P.C.

(57) ABSTRACT

A dark field microscope is capable of providing illumination with a long focal distance condenser lens having a low numerical aperture without the need for a diaphragm for an objective lens. A method is provided for effectively adjusting its optical axis. In particular embodiments, the dark field microscope includes; a light source for emitting illumination light; a light collecting optical system including a light collecting side condenser lens for collecting the illumination light from the light source to illuminate an observation sample; and an image forming optical system including an objective lens for receiving scattered light from the observation sample to form a magnified image of the sample, the light collecting side condenser lens is a long focal distance lens, and a light shielding member for shielding the illumination light is provided on a back focal plane or at an image forming center of it in the image forming optical system.

10 Claims, 4 Drawing Sheets

Prior Art

DARK FIELD MICROSCOPE AND ITS ADJUSTING METHOD

FIELD OF THE INVENTION

The present invention relates to a dark field microscope and a method for adjusting its optical axis.

BACKGROUND ART

The existence of the dark field microscope is common knowledge. The microscope includes a light source for emitting illumination light, a light collecting optical system including a light collecting side condenser lens for collecting the illumination light from the light source to illuminate an observation sample, and an image forming optical system including an objective lens for receiving scattered light from the observation sample to form a magnified image of the sample.

FIG. 1 is an explanatory diagram illustrating a principle of a conventional general dark field microscope.

Light from a light source is illuminated on an observation sample (21) in a flow cell (20) as circular illumination light (10) through a light collecting side condenser lens having a high numerical aperture. The illumination light is scattered by the sample (21); however, the illumination light (11) itself is shielded by an aperture diaphragm (23) present within an objective lens (22). For this reason, only scattered light (12) is emitted from the objective lens (22). By collecting the scattered light on an imaging area of a camera, a dark field image of the sample (21) can be obtained.

Light is scattered even by a particle or a structure smaller in size than a wavelength thereof, and therefore if a dark field microscope is used, even an object having a size equal to or smaller than a wavelength of visible light can be observed.

For example, a diameter of a microtubule is as small as approximately 24 nm; however, it becomes visible by a dark field microscope having a mercury lamp as a light source.

The dark field microscope has additional advantages, for example, a device and an operation are relatively simple; a high contrast image can be obtained; a raw sample can be observed without preprocessing; supermolecular movement and morphology change can be dynamically observed; and the like.

A conventional technique relating to the dark field microscope includes ones described in Patent documents 1 to 4.

Patent document 1 relates to an illumination system capable of easily switching between a bright field and a dark field; Patent document 2 relates to a configuration capable of observing only a target micro object without reducing a resolution; Patent document 3 relates to a configuration capable of observing an extremely fine object such as a flagellum of a living bacterium; and Patent document 4 relates to high speed processable automatic focusing and increase in brightness in the dark field microscope.

Patent document 1: Japanese Unexamined Patent Publication No. H09-297266, "Microscope"
Patent document 2: Japanese Unexamined Patent Publication No. H09-15507, "Dark field microscope"
Patent document 3: Japanese Unexamined Patent Publication No. H08-122651, "Transmission dark field microscope"
Patent document 4: Japanese Unexamined Patent Publication No. H05-346532, "Automatic focusing device of microscope and dark field microscope"

The dark field microscope according to such the conventional technique requires the aperture diaphragm (23) within the objective lens (22), and is also subject to the constraint that the light collecting side condenser lens having a high numerical aperture should be used.

If illumination can be provided through a long focal distance condenser lens having a low numerical aperture, a space can be ensured above the flow cell (20), and therefore there arise advantages of expanding an application range of experimental observation, and the like. However, a dark field microscope capable of realizing this has been absent.

DISCLOSURE OF THE INVENTION

Problem to be Solved by the Invention

It is therefore an object of the present invention to provide a dark field microscope capable of providing illumination even through a long focal distance condenser lens having a low numerical aperture without the need for an aperture diaphragm within an objective lens, and a method for effectively adjusting its optical axis.

Means Adapted to Solve the Problems

In order to accomplish the above object, a dark field microscope of the present invention includes the following configuration: That is, the dark field microscope is characterized by including a light source for emitting illumination light, a light collecting optical system including a light collecting side condenser lens for collecting the illumination light from the light source to illuminate an observation sample, and an image forming optical system including an objective lens for receiving scattered light from the observation sample to form a magnified image of the sample, wherein the light collecting side condenser lens is a long focal distance lens, and a light shielding member for shielding the illumination light is provided at an image forming center of a back focal plane in the image forming optical system.

In this case, in the image forming optical system, the light shielding member may be disposed at a position of a conjugate image of the back focal plane formed by forming a secondary image from a primary image. This configuration enables the light shielding member to be disposed outside the objective lens, which contributes to simplification in configuration.

As the light shielding member disposed at the image forming center of the conjugate image of the back focal plane, a light shielding plate having a diameter of $\phi e = \phi \cdot f_1 / L$ ($\phi$ is a diameter of an area to be shielded on the back focal plane; $f_1$ is a focal distance of the lens for forming the conjugate image of the back focal plane; and L is a focal distance of a second objective lens) may be used to contribute to the effective light shielding.

The image forming optical system for forming the secondary image from the primary image may include a plurality of lenses, and under a condition that a total focal distance of lenses for forming the conjugate image of the back focal plane among the plurality of lenses is $f_t = L \cdot \phi e / \phi$ (L is a focal distance of a second objective lens; $\phi e$ is a diameter of the light shielding member; and $\phi$ is a diameter of an area to be shielded on the back focal plane), a numerical aperture may be adjusted with a size of the light shielding member being constant.

Also, a mirror may be provided between the primary image and the secondary image to contribute to a dual port configuration.

In a configuration including the dark field microscope as described above and a camera for receiving an image by the dark field microscope, optical axis adjustment may be performed by adjusting a focal point of an eyepiece lens to thereby focus on the observation sample; adjusting a position of the light collecting side condenser lens to thereby provide Koehler illumination; adjusting a position of the image forming side lens to thereby focus the observation sample on an imaging area; adjusting a diaphragm for a primary imaging plane and a position of the mirror to thereby match a field center with a center of the camera; and adjusting a position of the light shielding member in an optical axis direction to thereby set it at a position where background light becomes darkest.

In this case, the position of the light shielding member may be adjusted in a direction vertical to the optical axis with a micrometer.

A contribution to obtaining a desired contrast may be made further by minimizing a field diaphragm on the light collecting side condenser lens; adjusting a black level with preventing the light from entering the camera, to thereby set a value of the level not to take a minus value; switching the light to a camera side, and adjusting an aperture diaphragm with the observation sample being focused on, to thereby set the aperture diaphragm at a position where the image becomes dark; and adjusting light intensity and the aperture diaphragm to thereby increase a light amount and narrow a numerical aperture.

The image may be made more visible by adjusting the black level to thereby optimize a background of the observation sample.

A preferable brightness may be obtained by adjusting the light intensity to thereby increase an amount of the scattered light from the observation sample.

Effect of the Invention

According to the dark field microscope of the present invention, because the light shielding member is provided at the image forming center of the back focal plane in the image forming optical system, an aperture becomes unnecessary for the objective lens, and also illumination can be provided through a long focal distance condenser lens having a low numerical aperture. For this reason, a space is ensured at a site of the observation sample, and therefore an application range of experimental observation is expanded.

Also, according to the dark field microscope adjusting method of the present invention, the light axis can be accurately adjusted with advantages of a conventional low-cost optical system, microscope, camera, and the like being taken.

BEST MODE FOR CARRYING OUT THE INVENTION

An embodiment of the present invention will hereinafter be described based on the drawings. Note that specifications in Example can be appropriately changed in design without departing from the scope of the present invention.

The present inventor has reviewed the nature of a dark field microscope to thereby obtain a principle of the present invention as follows: The nature of the dark field microscope is considered as means adapted to shield the illumination light (11) with some sort of optical member to image only the scattered light (12). As illustrated in FIG. 1, in the conventional techniques, the reason why the illumination light (11) is circular is that the shielding can be effectively performed by a diaphragm. That is, a configuration of illumination is determined from shielding means.

On the other hand, assume that the configuration of illumination is limited. For example, only a long focal distance condenser lens may be used. In such a case, by changing a configuration of shielding, a function as a dark field microscope becomes possible.

FIG. 2 is an explanatory diagram illustrating the principle of the dark field microscope according to the present invention.

Light from a light source passes through an aperture diaphragm (24), and then illumination light (10) is illuminated on a sample (21) in a flow cell (20) only through a low numerical aperture area of a long focal distance light collecting side condenser lens (25).

For example, under a condition that a magnetic tweezer or a solution exchange system is used, such illumination method should be chosen.

The illumination light is scattered by the sample (21); however, an image forming center of the illumination light (11) itself is shielded by a light shielding member (23) disposed on a back focal plane of an objective lens (22). For this reason, if only scattered light (12) emitted from the objective lens (12) is collected on an imaging area of a camera, a dark field image of the sample (21) can be obtained.

As the light shielding member (23), a transparent optical component selectively evaporated with a light reflecting material reflecting light, such as aluminum, on the center thereof, a glass plate attached with a light absorbing material absorbing light, such as suede, on the center thereof, contrary to the light reflecting material, and the like may be used.

A light flux of an optical system is defined by field and aperture diaphragms. The field diaphragm defines an image size, whereas the aperture diaphragm defines a diameter of the light flux, i.e., a numerical aperture.

A value of the numerical aperture is defined for each objective lens. In addition, in observation by eye with use of an eyepiece lens, an image of an aperture diaphragm through a lens before the aperture diaphragm is an entrance pupil and an image of an aperture diaphragm through a lens after the aperture diaphragm is an exit pupil, and the aperture diaphragm, the entrance pupil, and the exit pupil are respectively in conjugate relations.

Also, a light flux from a sample plane is formed of lines connected between respective points of the sample plane and the entrance pupil, whereas a light flux toward an image plane is formed of lines connected between the exit pupil and respective points of the image plane.

In general, a numerical aperture (NA) is given by a following expression:

$$NA = n \cdot \sin\theta \quad \text{(Expression 1)}$$

(n: refractive index, θ: illuminating angle of light)

The numerical aperture serves as an indicator for recognizing an angle at which the illumination light (10) is illuminated on the sample (21). As the illumination angle becomes steeper, a resolution of an image becomes higher. Because a scattering angle of light increases as a particle size decreases, light picked up by a higher numerical aperture area contains more high frequency components of the image, and therefore a finer structure can be observed. Thus, the numerical aperture is an important quantity for determining the resolution of an image.

Also, the reason why a characteristic of the objective lens (22) is expressed by the numerical aperture instead of an actual illumination angle θ is also obvious considering Snell's law. Even if light is refracted at an interface between different media, a value of $n \cdot \sin\theta$ is conserved, and therefore the use of the numerical aperture is more effective than description of the actual illumination angle θ itself.

A diameter ϕ of a pupil met by some numerical aperture in the objective lens (22) (infinity system) can be approximated by a following expression:

$$f = 2 \cdot NA \cdot L/M \quad \text{(Expression 2)}$$

(L: focal distance of a second objective lens, M: magnification of the objective lens)

The pupil can be considered as a size of a back focal plane. The back focal plane is an area where parallel light is collected when the light passes through an image plane. Also, if an ideal point light source is present on the image plane, a diameter of light expanding from the light source with some numerical aperture can be here considered as a diameter of the pupil.

Note that, on the back focal plane of the objective lens (22), the numerical aperture does not mean an angle but means a radius. On the sample (21) plane, it images the angle, whereas on the back focal plane, it corresponds to a circular ring of an area calculated by Expression 2. Also, if the sample is illuminated through a condenser lens, a corresponding numerical aperture is the same as even in the case of the objective lens (22).

In FIG. 2, the light shielding member (23) is disposed on the back focal plane of the objective lens (22); however, if the secondary image is created from the primary image with a lens being disposed behind a camera port, a conjugate image of the back focal plane can be formed between them. The light shielding member may be disposed at the conjugate image.

A diameter ϕe of the light shielding member for this case is given by a following expression:

$$\phi e = \phi \cdot f_1/L \quad \text{(Expression 3)}$$

(ϕ: diameter of an area to be shielded on the back focal plane, $f_1$: focal distance of the lens forming the conjugate image of the back focal plane, L: focal distance of the second objective lens)

By substituting Expression (3) into Expression (2), following Expression (4) can be obtained. In Expression (4), L is absent, and therefore it turns out that this expression is effective regardless of a microscope type.

$$NA = \phi e \cdot M/2f_1 \quad \text{(Expression 4)}$$

In addition, in observation by eye with use of the eyepiece lens, an exit pupil of the eyepiece lens corresponds to a pupil plane referred to as an eye point. Similarly to the relationship relating to the image plane, an exit pupil is relayed as an entrance pupil of a subsequent lens with the pupil planes being related to each other. For this reason, in a lens system after the objective lens (22), a position of a pupil cannot be uniquely defined. A distance between the objective lens (22) and a lens barrel may be changed, and therefor if a plurality of optical systems are connected, pupil matching is required.

The present invention can also be applied to dark field illumination with a laser used as a light source for the case where particularly strong light illumination is required for high speed photography or the like. In a conventional system, upon incidence of laser light to a dark field condenser, the light should be incident obliquely with respect to a sample plane to avoid the loss of light intensity (for example, Patent document 1).

On the other hand, in the present invention, similarly to an arc type light source, laser light is incident vertically with respect to a sample plane. The illumination light forms a point image on a back focal plane, and shielding it with the light shielding member (23) at the center results in the dark field illumination. This is more isotropic illumination than the oblique illumination, and therefore has an advantage of being able to obtain a more uniform image.

[Non-patent document 1] Yasuda, R., Noji, H., Yoshida, M., Kinosita, K., Jr. & Itoh, H. Resolution of distinct rotational substeps by submillisecond kinetic analysis of F1-ATPase. Nature 410, 898-904 (2001)

EXAMPLE

In combination of commercially available optical components manufactured by a plurality of optical equipment manufacturers, the dark field microscope based on the principle of the present invention was fabricated.

As a lens for forming a secondary image from a primary image, a combination of $f_1$=60 mm and $f_2$=150 mm was used to observe dust on a glass surface, and a good result not different from that by a conventional dark field microscope was obtained. However, there remains a problem that in the case where a halogen wavelength band was narrowed with a filter, a sufficient light amount could not be obtained.

As a numerical aperture of a condenser lens increases, an amount of illumination light increases, and therefore a numerical aperture that should be light shielded also increases; however, an amount of light illuminating the sample (21) also increases. If the objective lens (22) having a numerical aperture of 1.45 is used, it is considered that the scattered light (12) from the sample (21) can be sufficiently obtained even if the center of it is further shielded by an amount of a numerical aperture of 0.25.

If a light shielding plate is used as the light shielding member (23), the light shielding plate to be disposed may be freely configured with being replaced by any of various sized ones.

Instead of variously configuring a diameter of the light shielding member (23), a configuration may be made such that an imaging lens closer to the primary image is replaced, and the focal distance $f_1$ of it is variable. As is obvious from Expression (4), if $f_1$ is decreased, a numerical aperture of the light shielding plate for the entire optical system can be increased.

Also, under the condition that the image forming side optical system for forming the secondary image from the primary image includes a plurality of lenses, and a total focal distance of lenses for forming a conjugate image of a back focal plane among the plurality of lenses is adapted to be $f_1$=L·ϕe/ϕ, the numerical aperture may be adjusted with a size of the light shielding member (23) being constant.

If a dual port TV adaptor or the like is annexed, it is preferable to configure a mirror to be disposed between the primary image and the secondary image, and the conjugate image of the back focal plane to be also positioned before the mirror.

The light shielded numerical aperture, i.e., a numerical aperture used for the illumination was set to 0.375 with $f_1$ set to 40 mm. As compared with the case of $f_1$=60 mm, a light intensity is increased by $(60/40)^2$=2.25 times; however, an area of the objective lens, which is lost by the light shielding, becomes $(1.45-0.375/1.45-0.25)^2$=0.80 times. Accordingly, the light intensity is increased by approximately 1.8 times.

FIG. 3 is a profile for a case where a bead having a diameter of 0.2 μm was observed.

The sample bead is made of polystyrene, and bonded to a glass surface.

As a result of the observation under a condition that the lens for forming the secondary image from the primary image was set to have $f_1$=40 mm and $f_2$=150 mm, and the diameter of the light shielding plate was ϕ=500 mm, the bead was observed with sufficient brightness. In spite of a state where a gain of a CCD was maximized, and a dichroic mirror and an emission filter were attached for fluorescence observation, it turns out that the single piece of bead can be observed with sufficient intensity as illustrated in the diagram.

FIG. 4 is a diagram for a case where gliding motion of a bacterium was actually photographed.

One individual piece of Mycoplasma Mobile, which is motile bacteria, was observed, and as a result, it turns out that the gliding motion can be observed without any problem.

The bacteria (30) and (31) moved from start positions illustrated in FIG. 4 (A) along lines (31) and (31') indicated by arrows, and then reached end positions illustrated in FIG. 4 (B).

Regarding optical axis adjustment, a following procedure is preferable:

(1) Focus on a sample.

(2) Adjust xyz of the condenser lens so as to achieve Koehler illumination. Note that the Koehler illumination requires the condenser lens having a numerical aperture sufficient for observation and an illumination system in which a light source image can be projected on a focal plane of the condenser lens; and the field diaphragm can be properly imaged on the sample plane and narrow down to a necessary part.

(3) Switch the light to a camera side, and move a position of the condenser lens $f_1$ to focus the sample on the imaging area. This causes focuses of the eyepiece lens and the camera to be matched.

(4) Narrow the diaphragm for a primary imaging plane to adjust the mirror such that the center of a field is matched with that of the camera.

(5) Move the light shielding plate in an optical axis direction to set it at a position where the light illuminating the camera becomes darkest. Preferably, it is performed while moving the shielding plate in x, y directions with a micrometer.

Subsequently, as fine adjustment, a condition for obtaining an optimum image is found out while changing a setting of an aperture diaphragm, a light amount, and a black level of the camera.

(6) Adjust the black level of the camera not to take a minus value with the field diaphragm on the condenser lens being minimized to prevent the light from entering the camera.

(7) Switch the light to the camera side; gradually narrow the aperture diaphragm with the sample being focused on; and set the aperture diaphragm at a position where an entire screen suddenly darkens. In this state, a numerical aperture light shielded by the central light shielding plate and that of the condenser lens are matched.

(8) Increase intensity of the light, and when the entire screen is about to be saturated, further narrow the numerical aperture. By alternately repeating the two operations, an optimum contrast can be obtained.

(9) If the black level is adjusted such that a background reaches approximately 10 in 8 bits, the image becomes more visible. If necessary, further increase the light amount while monitoring brightness.

INDUSTRIAL APPLICABILITY

According to the dark field microscope based on the new principle of the present invention, with advantages of a conventional optical system, microscope, camera, and the like being taken, a diaphragm for an objective lens becomes unnecessary, and illumination can be achieved even with a long focal distance condenser lens having a low numerical aperture.

Along with this, a space can be ensured above an observation sample plane, and therefore an application range of experimental observation is expanded. This is particularly effective for a condition using a magnetic tweezer or solution exchange system that should employ such illumination method.

The dark field microscope has wide ranging applications in an industrial field such as an IC pattern inspection, and is industrially very useful.

DESCRIPTION OF REFERENCE NUMERALS

Figure 1:
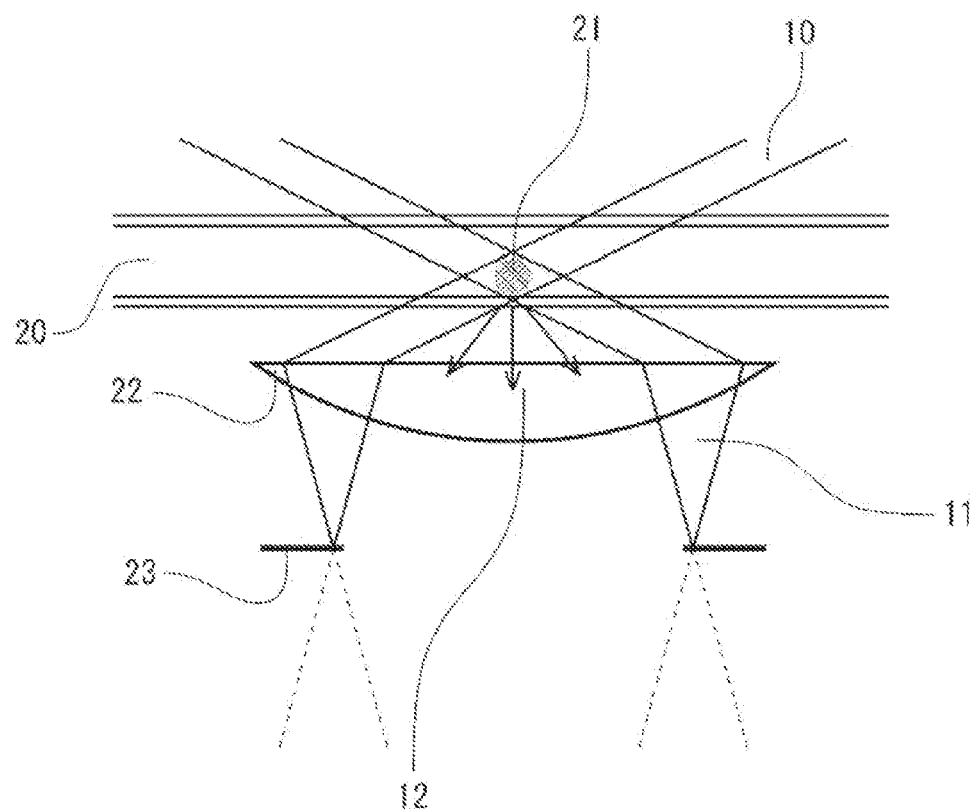
FIG. 1 is an explanatory diagram illustrating a principle of a conventional general dark field microscope.
Figure 2:
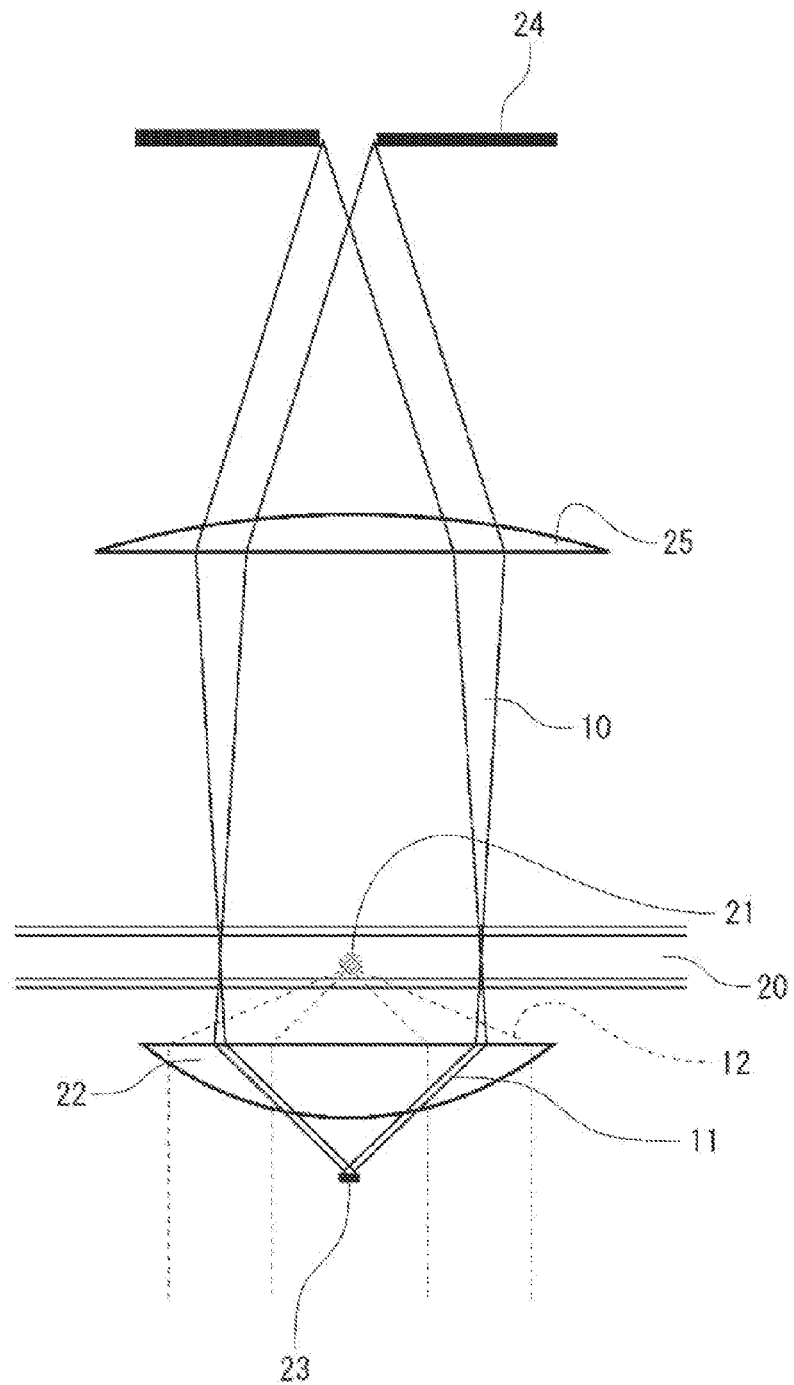
FIG. 2 is an explanatory diagram illustrating a principle of a dark field microscope according to the present invention.
Figure 3:
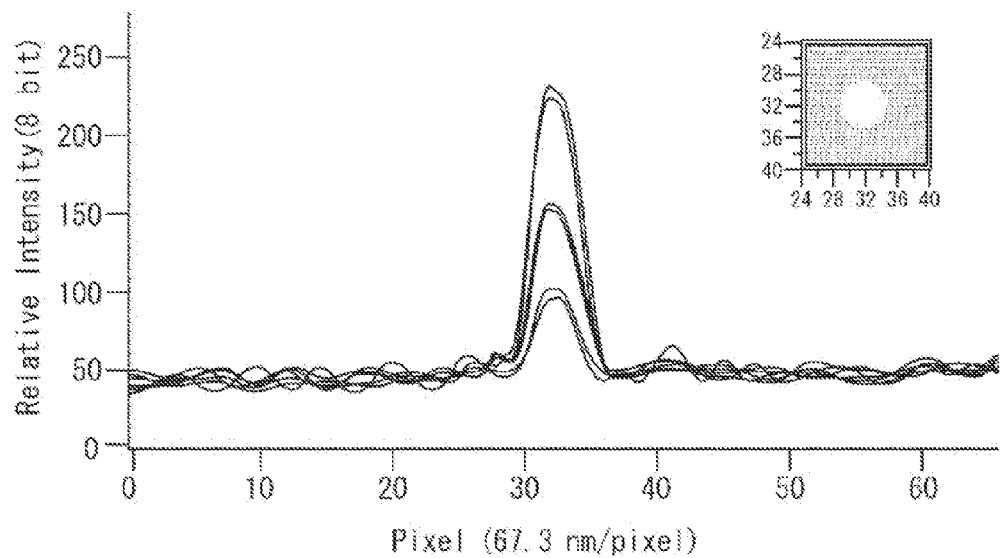
FIG. 3 is a profile for a case where a bead was observed.
Figure 4:
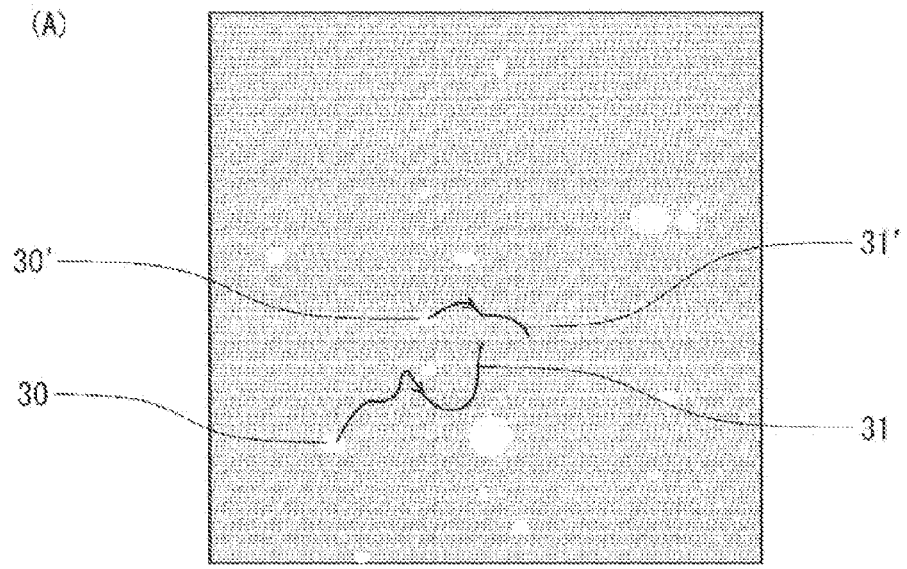
FIG. 4 is a diagram for a case where gliding motion of a bacterium was photographed.
Figure 4:
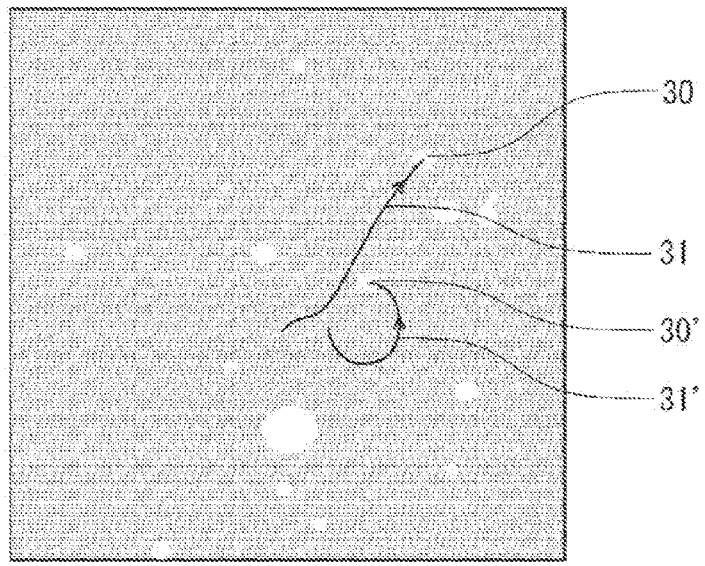

10: Illumination light onto observation sample
11: Illumination light
12: Scattered light
20: Flow cell
21: Observation sample
22: Objective lens
23: Image forming side aperture diaphragm, light shielding member
24: Light collecting side aperture diaphragm
25: Light collecting side condenser lens
30. 30': Bacterium
31, 31': Trajectory of bacterium

The invention claimed is:

1. A dark field microscope comprising:
a light source for emitting illumination light;
a light collecting optical system including a light collecting side condenser lens for collecting the illumination light from the light source to illuminate an observation sample; and
an image forming optical system including an objective lens for receiving scattered light from the observation sample to form a magnified image of the sample, wherein the light collecting optical system is configured such that the light collecting side condenser lens is a long focal distance lens, and the illumination light is illuminated on the observation sample only through a low numerical aperture area; and
the image forming optical system is configured such that a light shielding member for constantly shielding the entire beam of the illumination light is provided at an image forming center of a conjugate image of a back focal plane of the image forming optical system, and only the scattered light emitted from the objective lens is collected on an imaging area to obtain a dark field image of the observation sample.

2. The dark field microscope according to claim 1, wherein a lens for forming a secondary image from a primary image, and forming the conjugate image of the back focal plane between them is disposed in the image forming optical system.

3. The dark field microscope according to claim 2, wherein the light shielding member disposed at the image forming center of the conjugate image of the back focal plane is a light shielding plate having a diameter of $\phi e = \phi \cdot f_1 / L$ ($\phi$ is a diameter of an area to be shielded on the back focal plane; $f_1$ is a focal distance of the lens for forming the conjugate image of the back focal plane; and L is a focal distance of a second objective lens).

4. The dark field microscope according to claim 2, wherein the image forming optical system for forming the secondary image from the primary image comprises a plurality of lenses, and a total focal distance of lenses for forming the conjugate image of the back focal plane among the plurality of lenses is $f_t = L \cdot \phi e / \phi$ (L is a focal distance of a second objective lens; $\phi e$ is a diameter of the light shielding member; and $\phi$ is a diameter of an area to be shielded on the back focal plane).

5. The dark field microscope according to claim 4, comprising a mirror between the primary image and the secondary image.

6. A dark field microscope adjusting method wherein in a configuration comprising the dark field microscope according to claim 5, and a camera for receiving an image by the dark field microscope,
optical axis adjustment is performed by:
  adjusting a focal point of an eyepiece lens to thereby focus on the observation sample;
  adjusting a position of the light collection side condenser lens to thereby provide Koehler illumination;
  adjusting a position of the image forming side lens to thereby focus the observation sample on the imaging area;
  adjusting a diaphragm for a primary imaging plane and a position of a minor to thereby match a field center with a center of a camera; and
  adjusting a position of the light shielding member in an optical axis direction to thereby set it at a position where background light becomes darkest.

7. The dark field microscope adjusting method according to claim 6, wherein the position of the light shielding member is adjusted in a direction vertical to the optical axis with a micrometer.

8. The dark field microscope adjusting method according to claim 6, comprising:
  minimizing a field diaphragm on the light collecting side condenser lens;
  adjusting a black level with preventing the light from entering the camera, to thereby set a value of the level not to take a minus value;
  switching the light to a camera side, and adjusting an aperture diaphragm with the observation sample being focused on, to thereby set the aperture diaphragm at a position where the image darkens; and
  adjusting light intensity and the aperture diaphragm to thereby increase a light amount and narrow a numerical aperture.

9. The dark field microscope adjusting method according to claim 6, comprising adjusting the black level to thereby optimize a background of the observation sample.

10. The dark field microscope adjusting method according to claim 6, comprising adjusting the light intensity to thereby increase scattered light from the observation sample.

* * * * *

UNITED STATES PATENT AND TRADEMARK OFFICE
CERTIFICATE OF CORRECTION

PATENT NO. : 8,379,304 B2
APPLICATION NO. : 12/301858
DATED : February 19, 2013
INVENTOR(S) : Takayuki Nishizaka et al.

Page 1 of 1

It is certified that error appears in the above-identified patent and that said Letters Patent is hereby corrected as shown below:

In the Claim

Claim 6, Column 9, Line 17, after the word "claim" insert -- 1,2,3,4 or --.

Signed and Sealed this
Twenty-fourth Day of December, 2013

Margaret A. Focarino
*Commissioner for Patents of the United States Patent and Trademark Office*